Aug. 22, 1944.  F. G. BOUCHER  2,356,206
TEMPERATURE CONTROL CIRCUIT
Filed Feb. 25, 1941
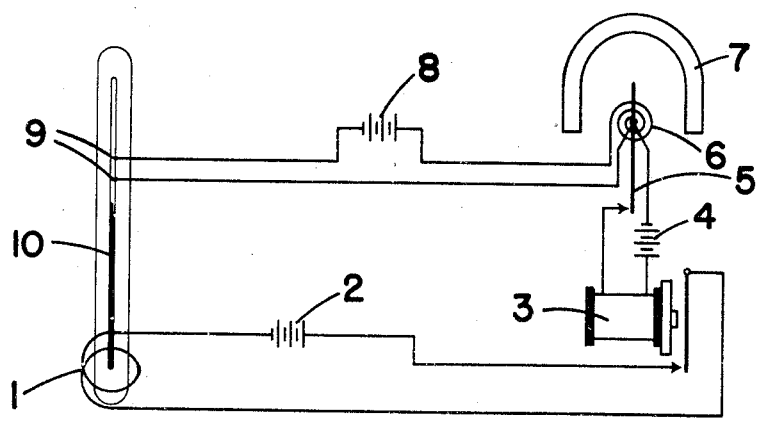
Frank G. Boucher INVENTOR.
BY P. J. Whelan
ATTORNEY Patented Aug. 22, 1944

2,356,206

UNITED STATES PATENT OFFICE 2,356,206

TEMPERATURE CONTROL CIRCUIT

Frank G. Boucher, Houston, Tex., assignor to Standard Oil Development Company, a corporation of Delaware Application February 25, 1941, Serial No. 380,510

1 Claim. (Cl. 219—20)

The present invention is directed to a highly sensitive relay system of the type used in temperature control circuits, and the like.

In extremely sensitive temperature control circuits associated with heating means it is necessary in order to obtain the desired sensitivity to use a mercury column of capillary proportions. Since there is a limit to the current which can be passed through this column between contacts arranged in it, it is necessary to use in conjunction with it a delicate relay which responds to small changes of current. This delicate relay, however, becomes troublesome when the system is arranged in a device which must be transported, and is, therefore, subject to jarring, because mechanical jars will operate the relay and interfere with the temperature control.

The principal object of the present invention is to provide in a system of the character described a means for preventing the fluctuations in the current supplied to the heating means due to this chattering or erratic behavior of the sensitive relay. Normally, this is done, according to the present invention, by interposing between the sensitive relay and the current to be controlled a current delay relay which has such a time lag that it does not respond to the chattering of the sensitive relay.

The present invention may be better understood from the following detailed description of the accompanying drawing in which the single figure is a schematic view of a system according to the present invention.

Referring to the drawing in detail, numeral 1 designates a heating coil supplied with current by a battery 2. It will be understood that in practice this heating coil will be arranged in a casing or chamber in the manner in which heating coils are customarily disposed. In the circuit of the heating coil is a time delay relay 3 which is supplied with current by a battery 4. In the circuit of the time delay relay is an extremely sensitive relay which is of the moving coil type having a moving arm 5, the movement of which is controlled by a coil 6 arranged in the field of a magnet 7. The current to coil 6 is supplied by a battery 8 and the circuit has a pair of contacts 9 arranged in a capillary column 10 of mercury which is arranged in the chamber in which the temperature is to be controlled.

As will be seen when the mercury rises in column 10 sufficiently to connect the contacts 9, the moving coil relay 6 opens the circuit of battery 4 which in turn causes relay 3 to open after the passage of its time lag period, opening the heating circuit of battery 2. Then when the temperature drops, breaking the contact between points 9, the reverse operation takes place.

Accidental operation of the moving coil relay due to jarring of the system does not affect the heating current because such operation will break the battery circuit 4 only momentarily which will not provide sufficient time to operate relay 3 which will remain closed.

The nature and objects of the present invention having been thus described and illustrated, what is claimed as new and useful and is desired to be secured by Letters Patent is:

In a device which in use is subjected to vibration and has a temperature control circuit utilizing a capillary column of mercury, in combination, a pair of contacts arranged in said column, an electrical circuit containing said contacts and also including a highly sensitive relay capable of operating on a very small current and being of a nature such as to be subject to undesirable operation due to vibration, a second circuit controlled by said relay and containing a time delay relay having a circuit opening lag suitable for the temperature control function of the circuit and sufficiently long to be unaffected by undesirable operation of said sensitive relay due to vibration, and a third circuit supplying the heating current controlled by said time delay relay.

FRANK G. BOUCHER.